Dec. 6, 1955          H. B. ALBERS          2,725,982
MOUNTING FOR BILLET CONTAINER OF EXTRUSION PRESS
Filed May 16, 1952          2 Sheets-Sheet 1
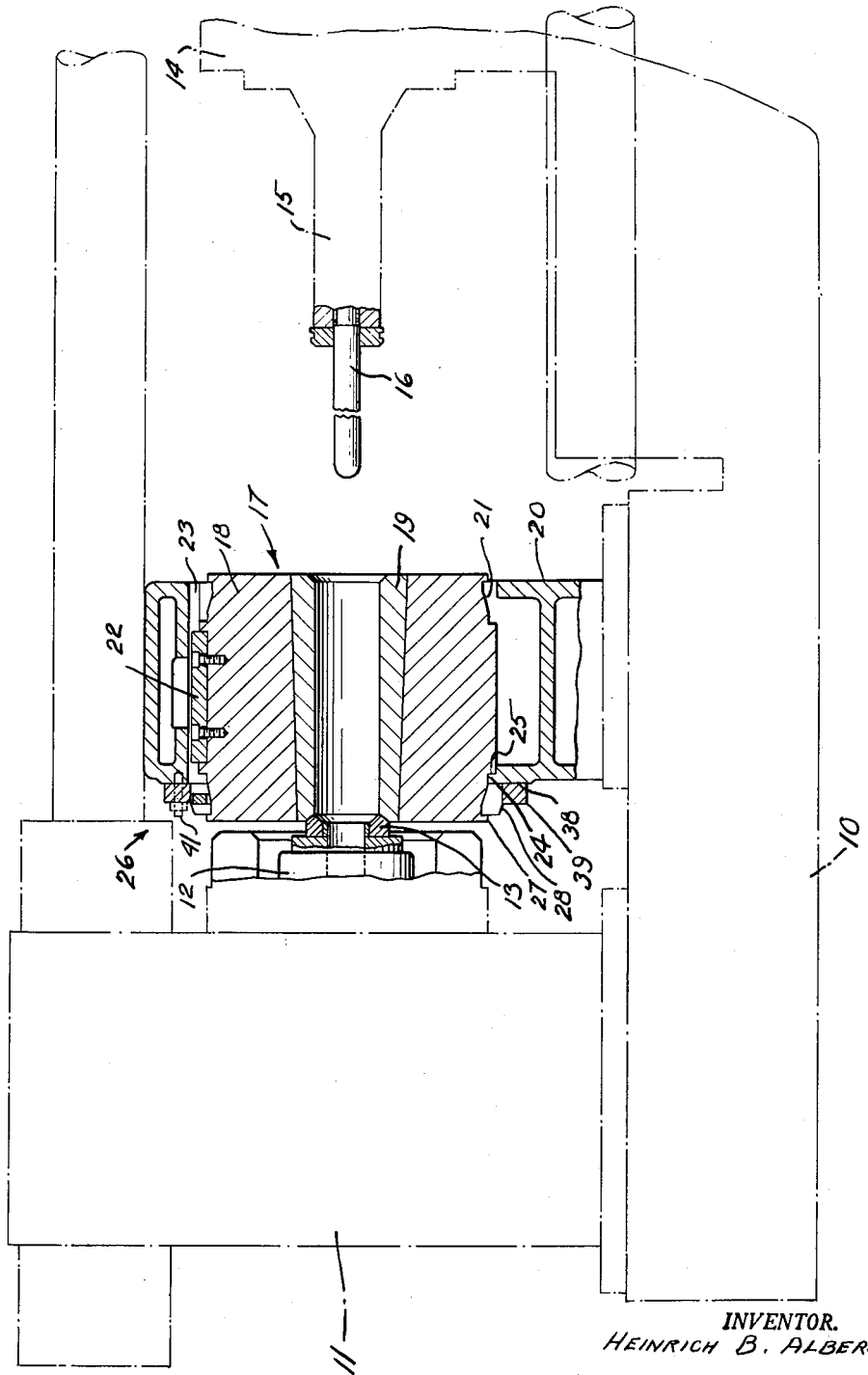
INVENTOR.
HEINRICH B. ALBERS
BY
Pollard and Johnston
ATTORNEYS Dec. 6, 1955    H. B. ALBERS    2,725,982
MOUNTING FOR BILLET CONTAINER OF EXTRUSION PRESS
Filed May 16, 1952    2 Sheets-Sheet 2
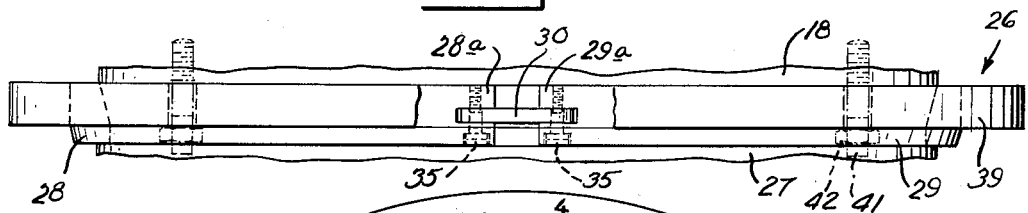
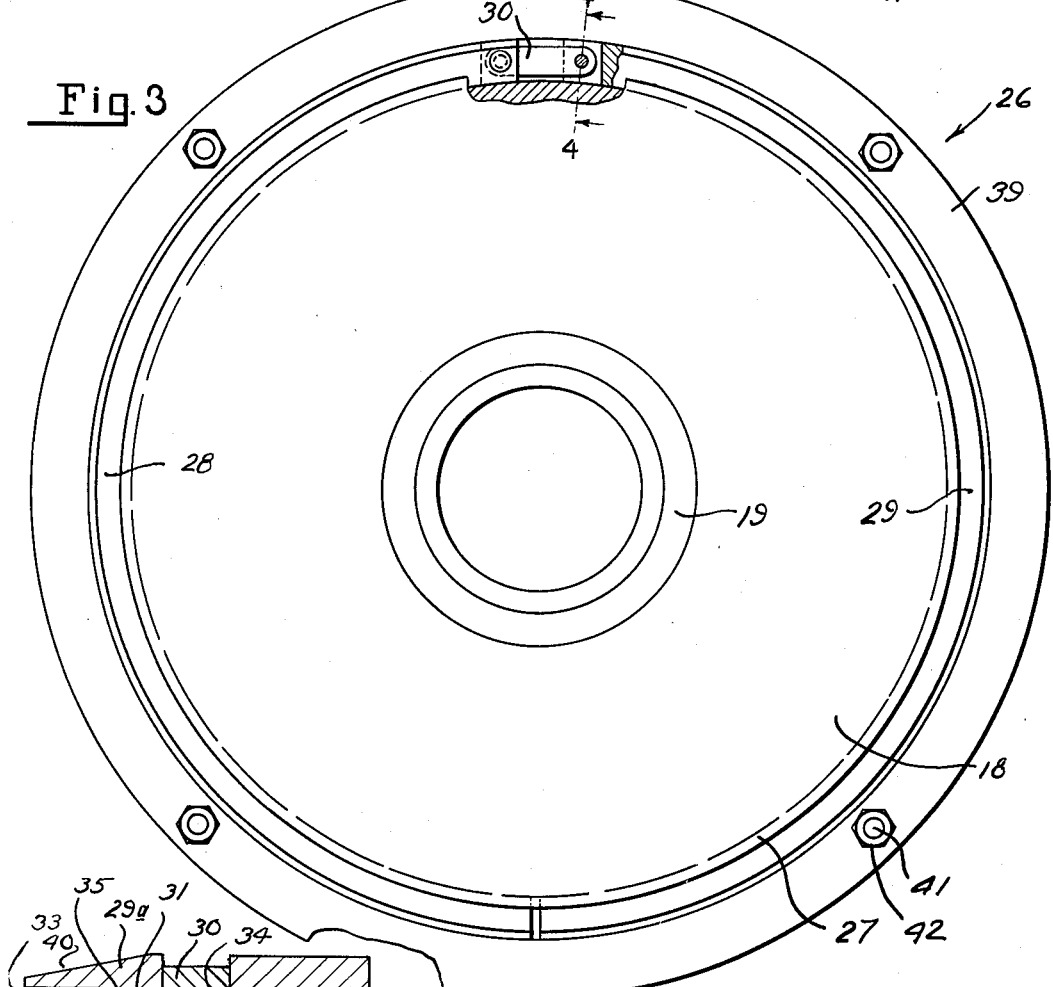
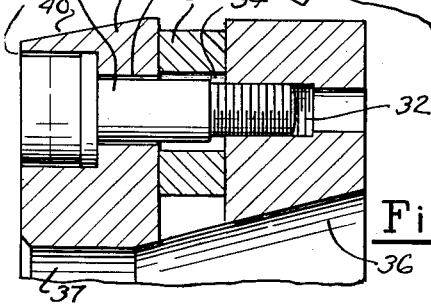
INVENTOR.
HEINRICH B. ALBERS
BY
Pollard and Johnston
ATTORNEYS United States Patent Office 2,725,982
Patented Dec. 6, 1955

2,725,982

MOUNTING FOR BILLET CONTAINER OF EXTRUSION PRESS

Heinrich B. Albers, Malverne, N. Y., assignor to Hydropress, Incorporated, New York, N. Y., a corporation of Delaware Application May 16, 1952, Serial No. 288,209

4 Claims. (Cl. 207—15)

The present invention relates to billet containers for extrusion presses, and is particularly directed to improvements in the mounting of billet containers on extrusion presses.

Extrusion presses conventionally include a base or bed-plate having a platen mounted at one end to support an extruding die, and a ram reciprocated along the base and carrying an extrusion stem and mandrel. A container having a suitable liner is supported on the base to guide or hold the material to be extruded, usually in the form of a billet, and is positioned in front of the die so that the extruding stem, in moving through the liner, will force the material between the mandrel and die opening to produce extruded articles. In order to adapt the press for the production of extruded articles of different shapes and sizes, it is desirable to mount the die and the container in a manner to permit their easy removal and replacement, while ensuring the rigid support thereof during operation of the press.

Accordingly, an object of the present invention is to provide structure for mounting a material guiding part or billet container on an extrusion press in a manner permitting easy removal and replacement of that part or container.

Another object is to provide an arrangement for mounting a billet container on an extrusion press of the described character wherein the container is removable axially from a supporting frame in the direction away from the press platen and is retained in its supporting frame by a clamping ring assembly which is constructed to prevent jamming or binding and thereby ensures easy removal.

A further object is to provide a clamping ring assembly for holding a billet container in its supporting frame on an extrusion press of the described character and which is operative to automatically center the container in its frame so that sufficient clearance may be provided between the frame and container to permit easy removal and installation of the latter.

In accordance with the present invention, the foregoing objects are accomplished by providing a frame on an extrusion press which is formed with an axial opening for receiving the billet container. The container is provided with suitable keys engaging in keyways on the frame to guide the container into the frame and to prevent relative rotation thereof. The container is formed with an external shoulder adjacent one end to abut against a flange on the frame for limiting the movement of the container in the direction toward the die supporting platen of the press. With the shoulder thus abutting against the flange, the adjacent end portion of the container projects from the frame to receive a clamping ring assembly operative to prevent removal of the container from the frame in the direction away from the platen. The clamping ring assembly includes a clamping ring formed of two semicircular portions which are pivotally connected at one end by a link device and form a conical inner surface engageable with a tapering surface on the container, and a retaining ring which fits over the clamping ring, to keep the portions of the latter in contact with the container, and is secured to the frame. Finally, the container is formed with an edge flange engageable with the clamping ring to hold the latter on the container.

The foregoing and other objects, features and advantages of the present invention will be manifest in the following detailed description of an illustrative embodiment thereof, when that description is read in connection with the accompanying drawings forming a part hereof, and wherein:

Fig. 1 is a longitudinal sectional view of a billet container and the mounting arrangement therefor embodying the present invention and shown in association with other parts of an extrusion press represented by broken lines;

Fig. 2 is a top plan view of a clamping ring assembly included in the mounting arrangement of Fig. 1, but on a larger scale and with certain parts broken away for the purpose of clarity;

Fig. 3 is an end elevational view of the billet container and mounting arrangement of Fig. 1, partly broken away and in section, but on an enlarged scale similar to that of Fig. 2; and Fig. 4 is a fragmentary sectional view taken along the line 4—4 of Fig. 3, and on a still further enlarged scale.

Referring to the drawings in detail, wherein the same reference numerals are used to designate the same parts throughout the several views thereof, a portion of a conventional extrusion press is shown in broken lines in Fig. 1 and includes a base or bed-plate 10 having a platen 11 mounted on one end thereof for supporting a die-holding assembly 12 and a die 13. A ram 14 is reciprocated along the base 10 by suitable hydraulically operated pistons (not shown) and has an extrusion stem 15 and mandrel 16 extending longitudinally therefrom in alignment with the die 13.

A container assembly, generally indicated by the numeral 17, includes a container body 18 having a longitudinal bore extending therethrough which receives a liner 19. The container assembly 17 is supported so that the liner 19 thereof will be longitudinally or axially aligned with the die 13 and with the extrusion stem 15, and in contact with the die 13.

In operation, a billet of the material to be extruded is placed within liner 19, and ram 14 is advanced so that the mandrel 16 projects through the liner and the opening of die 13. As the extrusion stem 15 moves through the liner 19, the material in the latter is extruded through the space defined between the die opening and the mandrel to produce hollow extruded articles. The shape of the die opening will determine the character or form of the extruded article, and the size of the cavity in liner 19 will determine the amount of material available for extrusion during a stroke of the press. Thus, it is necessary to replace the die and, in most instances, the container assembly, whenever a different article is to be extruded.

In order to increase the versatility of the extrusion press and the ease with which it may be adapted to the production of extruded articles of different shapes and forms, the present invention provides a mounting arrangement for the container assembly 17 which facilitates the removal and installation of the latter. In the illustrated embodiment of the invention, the container assembly 17 is mounted in a frame 20 which is suitably supported on the base 10 and may be movable toward and away from the platen 11 under the action of any conventional devices (not shown). The frame 20 is provided with a central opening 21 of sufficient size to loosely receive the container body 18 when the latter is inserted into the frame in the direction toward the platen 11.

As seen in Fig. 1, container body 18 has longitudinal keys 22 secured thereto and fitting into suitable keyways 23 formed in the frame 20 for guiding the container body into the frame and for preventing relative rotation of the container body and frame. The frame 20, at the side of the opening 21 facing toward platen 11, is formed with an annular flange 24 directed radially inward to engage against an external shoulder 25 formed on the container body 18 adjacent one end of the latter, thereby limiting longitudinal movement of the container body relative to the frame in the direction toward the platen.

In order to prevent withdrawal of the container assembly 17 from frame 20 in the longitudinal direction away from the platen, a clamping assembly, generally indicated by the numeral 26, is provided for removable engagement with the end portion of the container body 18 which projects from the frame in the direction toward the platen. In accordance with the present invention, the projecting end portion of the container body has an outer surface which tapers toward a right-cylindrical section next to an outwardly directed annular flange 27 extending along the edge of the body and having a diameter sufficiently small to pass through the opening defined by the flange 24.

The clamping assembly 26 includes a clamping ring for engagement between the end face of the frame 20 and the container body flange 27 and formed by two semi-circular ring segments 28 and 29 which are pivotally linked together at one end. In order to join together the ring segments 28 and 29, the adjacent ends thereof are bifurcated or forked, as at 28a and 29a, and a link 30 extends between the forked ends. Each forked end of the ring segments is formed with a bore 31 which is tapped at one end, as at 32, and counterbored at the other end, as at 33 (Fig. 4). The link 30 is formed with openings 34 adjacent its opposite ends for alignment with the bores 31 of the forked ends 28a and 29a and to receive bolts 35 having threaded ends engaging the tapped portions 32 of these bores.

As seen in Fig. 4, each ring segment has a conical or tapering inner surface portion 36 shaped to fit upon the corresponding tapering portion of the outer surface of the container body 18 and a right-cylindrical inner surface portion 37 to fit upon the corresponding surface portion of the container body next to flange 27 of the latter. Thus, the ring segments 28 and 29 may be swung apart to pass over the flange 27 for disposition between the latter and the adjacent face 38 of the container supporting frame 20.

The clamping ring assembly 26 further includes a retaining ring 39 formed to fit over the linked together ring segments 28 and 29 and hold the latter in contact with the container body surface. In order to facilitate the movement of retaining ring 39 onto the clamping ring, the clamping ring segments preferably are formed with tapered outer surface portions 40 (Fig. 4). Studs 41 extend from the face 38 of the frame 20 and pass through suitable openings formed in the retaining ring 39. Nuts 42 are threaded on the studs 41 to hold the retaining ring 39 on the clamping ring segments 28 and 29.

In removing the container assembly 17 from its supporting frame 20, the nuts 42 are screwed off studs 41 to permit axial withdrawal of the retaining ring 39 from its operative position on the clamping ring segments. After the retaining ring has been withdrawn, the clamping ring segments are free to be spread apart and lifted over the flange 27 thereby removing the impediment to movement of the container body 18 out of the frame 20 in the direction away from the platen 11.

When the clamping ring assembly 26 is in its operative position illustrated in the drawings, the keys 22 and ring 39 ensure the correct alignment of the container body relative to frame 20, and the wedging action, resulting from contact of the tapering surface 36 of the ring segments with the corresponding surface portion of the container body, ensures the rigid clamping of the container body within its supporting frame.

From the foregoing description of a preferred embodiment of the invention, it will be apparent that an arrangement has been provided for mounting a material guiding part or container on an extrusion press in a manner permitting easy removal and replacement of that part or container and without the danger of jamming or binding.

While a particular preferred embodiment of the invention has been illustrated and described in detail, it is to be understood that the invention is not limited to that precise embodiment and that various changes and modifications may be made therein by one skilled in the art without departing from the scope of the invention as defined in the appended claims.

What is claimed is:

1. In combination, a billet container having an outwardly directed annular member on one end thereof, a support frame having an opening therethrough to axially receive said container, cooperative means on said frame and container for limiting the axial movement of the latter in one direction relative to the frame to a position in which said one end of the container projects from said frame, a split clamping ring including a pair of substantially semi-circular ring segments removably engageable around the projecting end portion of said container between said member on the latter and the adjacent end of said frame for preventing axial movement of the container in the opposite direction relative to the frame, and means for holding said clamping ring in closed position and in engagement with said container.

2. In combination, a billet container having an outwardly directed annular flange on one end thereof, a support frame having an opening therethrough to axially receive said container, cooperative means on said frame and container for limiting the axial movement of the latter in one direction relative to the frame to a position in which said one end of the container projects from the adjacent end of said frame, a split clamping ring removably engageable around said projecting end portion of the container between said flange on the latter and said adjacent end of the frame, and a retaining ring fitting axially over said split clamping ring to hold the latter against said projecting end portion of the container so that said split clamping ring prevents axial movement of the container in the opposite direction relative to the frame.

3. In combination, a billet container having an outwardly directed annular flange on one end thereof and an outer surface portion adjacent said flange and tapering toward the latter, a support frame having an opening therethrough to axially receive said container, cooperative means on said frame and container for limiting the axial movement of the latter in one direction relative to the frame to a position in which said tapering outer surface portion of the container projects from the adjacent end of said frame, a split clamping ring having a tapering inner surface to conform to said tapering outer surface portion of the container and removably engageable around the latter between said flange and said adjacent end of the frame, and a retaining ring fitting axially over said split clamping ring to hold the latter radially against said tapering outer surface portion of the container for preventing axial movement of the latter in the opposite direction relative to the frame.

4. In an extrusion press, the combination comprising a billet container having an outwardly directed annular flange on one end thereof, a support frame having an opening therethrough to axially receive said container, cooperative means on said frame and container for limiting the axial movement of the latter in one direction relative to the frame to a position in which said one end of the container projects from the adjacent end of said frame, a split clamping ring including a pair of substantially semi-circular ring segments engageable around said projecting end portion of the container between said flange and said adjacent end of the frame and means pivotally connecting together said ring segments at one end thereof so that said ring segments may be spread apart to pass over said flange, and a retaining ring fitting over said clamping ring to hold said ring segments against said projecting end portion of the container whereby said ring segments prevent axial movement of said container in the opposite direction relative to the frame.

References Cited in the file of this patent

UNITED STATES PATENTS

| | | |
|---|---|---|
| 2,474,633 | Marshall | June 28, 1949 |
| 2,594,009 | Gibian | Apr. 22, 1952 |

FOREIGN PATENTS

| | | |
|---|---|---|
| 707,810 | Germany | July 4, 1941 |